United States Patent [19]

Peck

[11] 4,231,638
[45] Nov. 4, 1980

[54] MICROSCOPE OBJECTIVE

[75] Inventor: Theodore H. Peck, Fairport, N.Y.

[73] Assignee: Bausch & Lomb Incorporated, Rochester, N.Y.

[21] Appl. No.: 953,230

[22] Filed: Oct. 20, 1978

[51] Int. Cl.³ .......................... G02B 7/10; G02B 7/02
[52] U.S. Cl. ..................................... 350/255; 350/79
[58] Field of Search ............................. 350/235–257, 350/70, 78–79, 175 ML, 6–7; 356/382

[56] References Cited

U.S. PATENT DOCUMENTS

| 2,430,851 | 11/1947 | Allen | 351/6 |
| 2,533,371 | 12/1950 | Heine | 350/175 ML |
| 2,764,061 | 9/1956 | Kinder et al. | 350/252 |
| 4,023,189 | 5/1977 | Govignon | 351/7 |
| 4,061,423 | 12/1977 | Pomerantzeff | 351/7 |

OTHER PUBLICATIONS

Bourne et al "Clinical Specular Microscopy", American Acadmey of Ophthalmology & Otolaryngology, vol. 81, 9,10–76, pp 743–753.
Advertisement, "Now, the Present & Future Health of the Cornea is Well Within Sight", Heyer Schulte Medical Optics Center.
Advertisement, "Clinical Endothelial Photomicroscope-An Instrument for Viewing & Photographing The Corneal Endothelium in Vivo" Bio Optics Inc.
Advertisement, "Clincial Examination of the Corneal Endothelium" Bio Optics Inc.
Specification, "HS-CEM3 Corneal Endothelial Microscope", Model 3 Specifications & Features, Heyer Schulte Med. Optics Center.
Advertisement, "Clinical Endothelial Photomicroscope", Bio Optics Inc.
Bibliography–"Corneal Endothelium", revised by Patricia M. Knight, 9/10/77, Heyer Schulte.
Advertisements "The Medical Optics Center Corneal Endothelial Microscope with Digital Pachometer", Meyer Schulte Medical Optics Center.

Primary Examiner—John K. Corbin
Assistant Examiner—Wm. H. Punter
Attorney, Agent, or Firm—Frank C. Parker; John S. Norton

[57] ABSTRACT

An improved objective for a microscope, particularly clinical specular microscopes for the observation of cornea endothelium cells, comprises a housing having first and second tubular lens holders slidably disposed therein. The second tubular lens holder is slidably and telescopically disposed within the first tubular lens holder. The lens holders are spring loaded which allows them to recede under tension into the housing when the object being viewed presses against the exterior of the first lens holder. This helps to protect the subject when viewing the cornea endothelium in vivo. The holders return to their original position upon removal of the object. A focusing mechanism is provided which incrementally moves the second tubular lens holder, thereby focusing the objective lenses contained therein, no matter what the position of the first lens holder is, thereby facilitating examination of the cornea. A measuring mechanism is also provided which quantifies the incremental movement of the focusing mechanism so that a measurement of the thickness of the cornea being viewed is produced.

10 Claims, 6 Drawing Figures

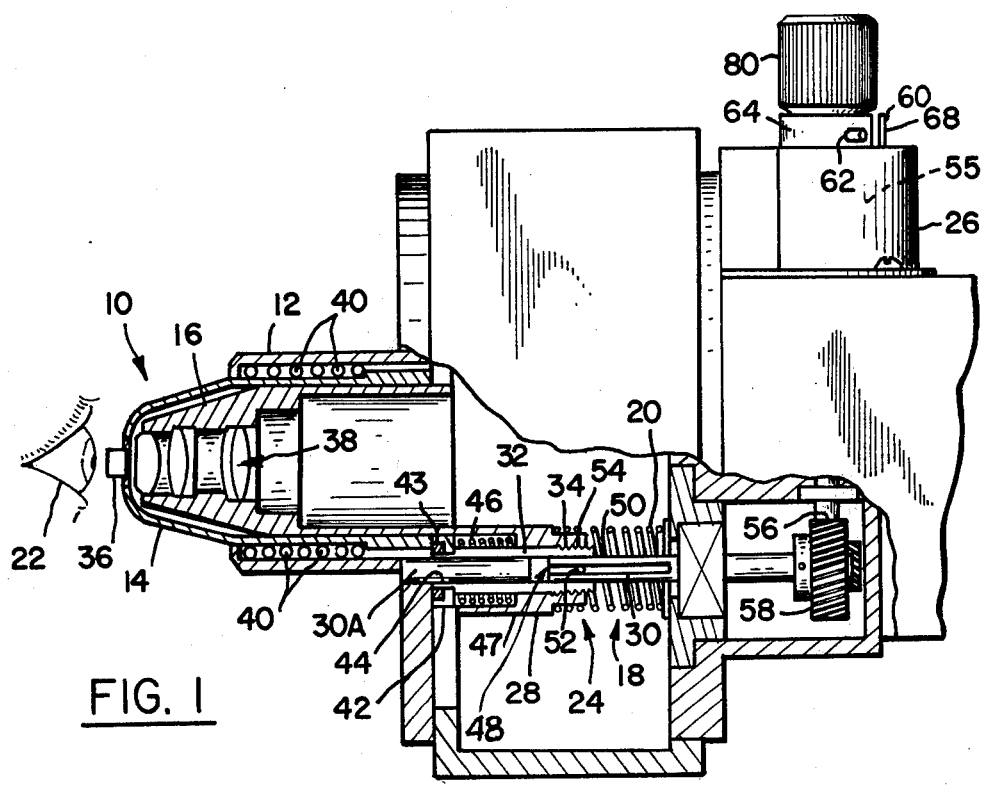
FIG. 1
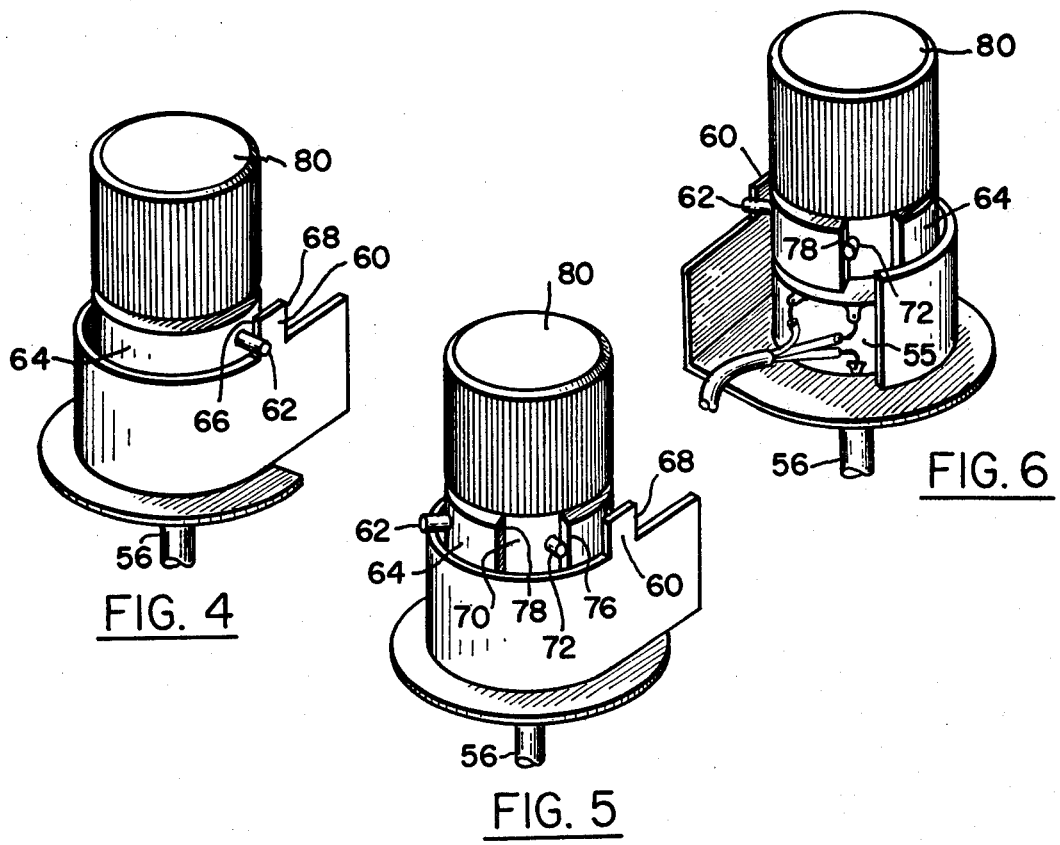
FIG. 4
FIG. 5
FIG. 6

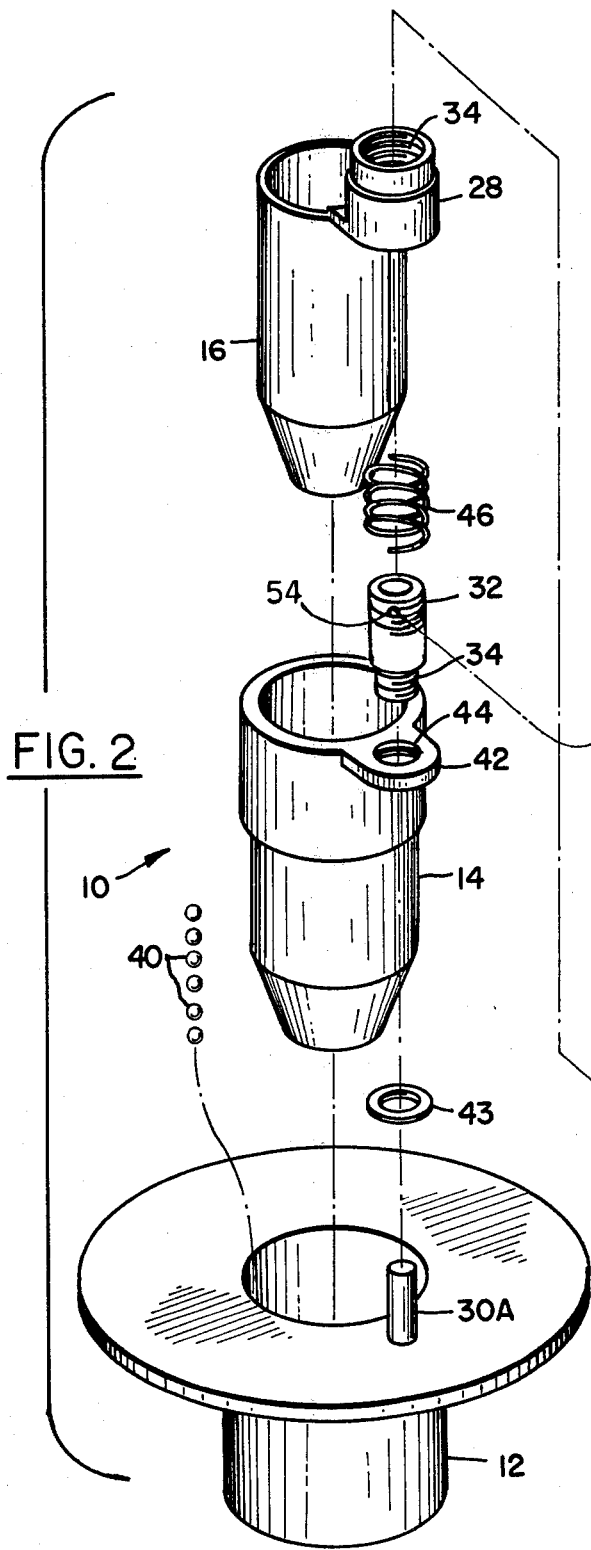
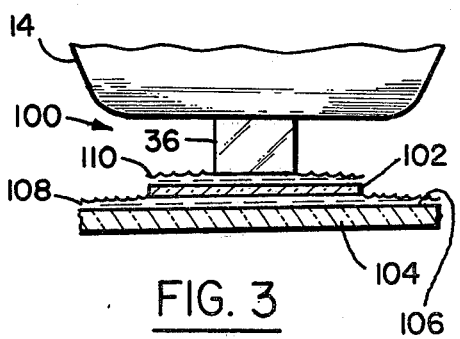

MICROSCOPE OBJECTIVE

BACKGROUND OF THE INVENTION

This invention relates generally to microscope objectives and more specifically to objectives for clinical specular microscopes designed to view cornea endothelium cells used in diagnosing the health of the cornea.

Modern procedures for cataract extraction and replacement with donor corneal lenses have resulted in significant saving of human sight for many individuals. One of the problems associated with such lens substitution, and optometric diagnosis generally, however, is determining the health of the cornea. Studies have indicated that microscopic evaluation of the cornea endothelium is a means of measuring the trauma which the eye has undergone, and consequently the relative health of the cornea. This evaluation is based on the fact that endothelium cells, for the most part, are not regenerative and as a result calculation of the number of endothelium cells present indicates the presence or absence of trauma in the past.

In order to conduct such an evaluation, cornea endothelium microscopy has been developed. Heyer Schlute and Bio Optics, Inc., for example, have developed microscopes for use in viewing the endothelium. However, several difficulties have developed in the utilization of such microscopes.

One of the primary problems in the use of such microscopes is that the focal point of the lens, which is within the cornea, requires that the objective be extremely close to the exterior of the cornea. As a result, the objective frequently comes in contact with the cornea which prevents focusing of the microscope, causes some discomfort to the patient, and in some cases damages the objective lens. An additional problem has been that while it is relatively easy to count the number of endothelium cells present at a particular layer, it is extremely difficult to approximate the thickness of the endothelium layer, which is also an indication of the relative vitality of the cornea.

Accordingly, it is an objective of the present invention to provide an objective for cornea endothelium microscopes, and microscopes in general, which when coming in contact with the object being viewed, recede into the objective housing.

The use of spring biased objectives which allow such recession, generally, is old in the art and may be seen in the following issued U.S. patents:

| Pat. No. | Inventor | Issue Date |
| --- | --- | --- |
| 2,533,371 | Heine | Dec. 12, 1950 |
| 2,195,657 | Ott | Apr. 2, 1940 |
| 1,889,794 | Sabel | Dec. 6, 1932 |
| 1,557,503 | Sabel | Oct. 13, 1925 |
| 2,764,061 | Kinder | Sept. 25, 1956 |
| 197,096 | Huel | Apr. 10, 1958 |
| (Austrian) | | |

However, none of the references cited discloses a spring loaded objective in which the ability to focus remains after the objective has come into contact with the object being viewed.

It is an additional objective of the invention to provide a microscope objective which allows the accurate measurement of the thickness of the material being viewed.

SUMMARY OF THE INVENTION

The present invention is an improved objective system for a microscope, particularly clinical specular microscopes for the observation of cornea endothelium cells. The invention comprises a housing which contains first and second lens holding members. The second lens holding member is slidably and telescopically disposed within the first lens holding member, both of which are slidably and telescopically disposed within the housing. Spring loading is used to allow both the first and second lens holding members to controlledly recede within the housing by pushing against a measured spring when the first lens holding member presses the object being viewed. When the objective or the object are moved away, the first and second lens holder return to their original position.

Means are also provided for focusing the objective through incremental movement of the second lens holding member while maintaining the first lens holder (and the lens it contains) in a fixed position. At the same time a measuring system is incorporated which can provide a precise measurement of the incremental movement of the second lens holder and, thereby indicate the thickness of the specimen being viewed or portions thereof through quantification of this incremental movement.

The focusing system previously described comprises, generally a tubular appendage extending from the second lens holding member into the housing. A shaft runs through the tubular appendage within the housing. The shaft is engaged with the tubular appendage by means of a threaded collar attached to the shaft which interacts with a threaded portion of the interior of the tubular appendage. A spring maintains pressure between the outer and inner lens holding members. When the shaft is rotated, the second lens holding member is moved incrementally forward or backward by means of the interaction between the threaded collar and the threaded portion of the tubular appendage.

One of the additional features of the invention is the use of separate lens holding members so that a first objective lens may be contained within the first lens holder and the remainder of the objective lenses may be contained within the second lens holder. As a result, the first lens may be positioned in contact with the object to be viewed, and remain stationary against the object while the objective is focused at various levels within the object. In addition, the first lens is designed to be easily removable and replaceable if it becomes scratched or smudged.

Consequently, the present invention is particularly useful in viewing and measuring the cornea endothelium because it can be positioned directly against the cornea, then focused at the endothelium.

Of additional assistance in this regard is a further feature of the invention; the previously mentioned spring loading mechanism. The mechanism comprises a ball sleeve bearing system between the first lens holding member and housing which allows the first lens holding member to be slid back and forth within the housing. A rigid tab extends perpendicularly from the interior edge of the first lens holding member. This rigid tab has a circular aperture therethrough which is rotatably engaged about the previously mentioned threaded collar used in focusing. The threaded collar is slidable along the previously mentioned shaft. At the opposite end of the threaded collar is a spring which interacts or presses against the tubular appendage with the threaded collar fixed therein, thus retarding the first lens holding member when it moves toward the spring. As a result, when force is applied against the first lens holding member it slides into the housing but is retarded by the spring. When released, the first lens holding member returns to its original position.

In order to combine the spring loading feature and the internal focusing feature of the invention, a slot and pin mechanism is employed within the previously mentioned shaft. The shaft has a slot running along its length. In the slot is a pin which is fixed in the threaded collar around the shaft. Consequently, when the shaft is turned, the pin rotates, causing the threaded collar to rotate. The threading, which is on the outer surface of the collar, is screwed into the threading on the tubular appendage from the second lens holder. A spring maintains an opposing force between the rigid tab and the tubular appendage, thus preventing backlash from the threading. Consequently, rotation of the collar causes a worm screw effect; the tubular appendage moves forward or back, depending on the direction of rotation of the shaft, which causes the second lens holder to move correspondingly.

At the same time because the shaft is slotted, the tubular appendage and the threaded collar can slide along the shaft; the pin slides within the slot. The rigid tab can also slide along the shaft due to the circular aperture through its center engaged about the collar which in turn is slidingly engaged about the shaft. Consequently, when the first lens holder is forced toward the interior of the housing, the rigid tab extending from the first lens holder presses against the threaded collar, as well as the spring interposed between the tab and the tubular appendage. The rigid tab, the tubular appendage, the threaded collar and the pin fixed therein all slide along the shaft, thereby allowing both the first and second lens holders to recede into the housing.

At the same time, it is necessary to maintain the position of the first lens holder while the second lens holder is being adjusted. This is accomplished by having the threaded collar held in place relative to the rigid tab by a threaded lock nut attached to the threaded collar on the opposite side of the rigid tab. Thus, the threaded collar can rotate within the rigid tab, allowing adjustment of the second lens holder, but cannot move forward or backward within the rigid tab. In this regard the spring positioned within the tubular appendage maintains an opposing force between the rigid tab and the tubular appendage, thus precisely maintaining the position of the tubular appendage relative to the rigid tab, as well as preventing backlash between the threads of the threaded collar and the threaded portion of the tubular appendage.

An additional feature of the invention is the mechanism provided for measuring change in the focal point of the lens system. A potentiometer is connected to the previously mentioned shaft which indicates the amount of revolution of the shaft during focusing. The potentiometer is calibrated to correlate the amount of revolution to the distance which the second lens holder moves, and the corresponding shift in focal point through the objective lens series. In order to utilize the measuring system, the lens system is focused on a known thickness of glass watered on both sides. The readout is varied to read this known thickness. Therefore, any change in focus, changes the readout and thus provides a reading of the cornea thickness.

An additional feature of the invention is the knob design of the potentiometer used in measuring thickness. The potentiometer includes a raised tab which acts as a stop. A pin extends from a collar about the potentiometer shaft. As the shaft rotates, the pin rotates until it comes in contact with the raised tab, causing it to stop. Thus, the shaft has rotated approximately 350°. In order to provide a measurement of one total revolution of the shaft (360°), the previously mentioned collar has a gap in it representing the remaining degrees necessary to equal 360°. A second pin extends from a second collar within the first collar. This pin is positioned on one side of the gap before rotation begins. When the first pin comes in contact with the tab, the shaft continues to rotate within the collar, until the second pin is stopped by the other side of the gap. Consequently, a precise rotation of 360° is allowed.

BRIEF DESCRIPTION OF THE DRAWINGS

FIG. 1 of the drawings is a side cut-away view of an improved objective system for a microscope.

FIG. 2 of the drawings is an exploded perspective view of the invention showing in particular focusing means used to incrementally move the second lens holding member.

FIG. 3 of the drawings is a side view of a calibration slide used to calibrate the improved objective system.

FIG. 4 of the drawings is a side perspective view of the improved potentiometer knob used to indicate incremental movement of the objective lens system.

FIG. 5 of the drawings is a side perspective view of the potentiometer knob shown in FIG. 4 in which the shaft of the potentiometer has rotated approximately 350°.

FIG. 6 of the drawings is a side perspective view of the potentiometer knob on the opposite side from that shown in FIG. 4 in which the shaft has rotated approximately an additional 10° from that shown in FIG. 5 of the drawings.

DETAILED DESCRIPTION OF THE PREFERRED EMBODIMENT

While this invention is susceptible of embodiment in many different forms, there is shown in the drawings and will herein be described in detail, several specific embodiments, with the understanding that the present disclosure is to be considered as an exemplification of the principles of the invention and is not intended to limit the invention to the embodiments illustrated.

Improved microscope objective 10, as shown in FIG. 1, comprises housing 12 which contains first lens holding member 14 and second lens holding member 16. Second lens holding member 16 is slidably and telescopically disposed within first holding member 14, which in turn is slidably and telescopically disposed within housing 12. A spring loading system 18 allows first lens holding member 14, with second lens holding member 16 contained therein, to be controlledly received within housing 12 when first lens holding member 14 presses the object 22 being viewed, which in a preferred embodiment is the human eye. The primary means of controlling this movement of first lens holder 14 is spring 20, which compressively retards such movement. When the object 22 being viewed is moved away, first lens holder 14 with second lens holder 16 contained therein returns to its original position due to spring 20. Focusing means 24 are also provided for focusing objective 10 through incremental movement of second lens holding member 16, while maintaining first lens holder 14 in a fixed position. At the same time, a measuring system 26 is incorporated with the objective which provides a precise measurement of the incremental movement of the second lens holder 16 and thereby, indicates the thickness of the cornea of the specimen 22 being viewed.

Previously described focusing system 24 comprises generally a tubular appendage 28 (best seen in FIG. 2) extending from second lens holding member 16 into housing 12. A shaft 30 runs through tubular appendage 28 within housing 12. In a preferred embodiment, the shaft is broken into two parts 30 and 30A. 30A is stationary. Shaft 30 is engaged with tubular appendage 28 by means of a threaded collar 32 around it. Threaded collar 32 interacts with a threaded portion 34 of the interior of tubular appendage 28. When shaft 30 is rotated, second lens holder 16 is moved incrementally forward or backward by means of interaction between the threaded collar 32 and the threaded portion 34 of tubular appendage 28.

In one embodiment of this invention the threaded collar 32 would ideally have 44 threads per inch whereby one revolution of the shaft member 30 would result in a movement of the second lens holder 16 exactly 0.23 MM which would correspond to a shaft in focal length of 1 MM.

One of the features of the invention is the use of separate lens holding members so that a first objective lens 36 may be contained within the first lens holding member 14 and the remainder of the objective lenses, as illustrated by lens series 38, may be contained within the second lens holder 16. As a result, the first lens 36 may be positioned in contact with the object 22 to be viewed and remain stationary against the object 22 while objective 10 is focused at various levels within the object 22. In addition, first lens 36 is designed to be easily removable and replaceable if it becomes scratched or smudged, by means of a screw. Consequently, the present invention is particularly useful in viewing and measuring the cornea endothelium because it can be positioned directly against the cornea, then focused at the endothelium.

Of particular assistance in this regard is the previously mentioned spring loading mechanism 18. The mechanism comprises a ball sleeve bearing system 40 between the first lens holder 14 and housing 12 which allows the first lens holder to be slid back and forth within housing 12. A rigid tab 42 extends perpendicularly from the interior edge of the first lens holding member 14. A rigid tab 42 has a circular aperture 44 through its center which is rotatably engaged about threaded collar 32. Threaded collar 32 is slidable along shaft 30A. At the opposite end of threaded collar 32 is a spring 20 which presses against tubular appendage 28 with threaded collar 32 fixed therein thus retarding first lens holding member 14 when it moves toward spring 20. As a result, when force is applied against first lens holding member 14 it slides into housing 12 but is retarded by spring 20. When released, first lens holding member 14 returns to its original position.

In order to combine spring loading mechanism 18 with internal focusing system 24, a slot and pin mechanism 48 is employed with shaft 30. Shaft 30 has a slot 50 running along its length. In the slot is a pin 52 which is fixed to threaded collar 32. When shaft 30 is rotated, pin 52 also rotates causing threaded collar 32 to correspondingly rotate. Threading 54 on the outer surface of collar 32 is screwed into threaded portion 34 of the interior of tubular appendage 28. Spring 46 maintains an opposing force between rigid tab 42 and tubular appendage 28, thus preventing backlash between threading 54 and threaded portion 34.

At the same time because shaft 30 is slotted, tubular appendage 28 and threaded collar 32 can slide along shaft 30; pin 52 slides within slot 50 allowing such movement. Rigid tab 42 can also slide along shaft 30A due to aperture 44 slidingly engaged about shaft 30A. Consequently, when first lens holder 14 is forced towards the interior of housing 12, rigid tab 42 presses against threaded collar 32 and spring 46. Rigid tab 42, tubular appendage 28, threaded collar 32 and pin 52 slide along shafts 30 and 30A allowing first lens holder 14 and second lens holder 16 to recede within housing 12.

At the same time, it is necessary to maintain the position of first lens holder 14 while second lens holder 16 is being adjusted. This is accomplished by having threaded collar 32 held in place relative to rigid tab 42 by a threaded lock nut 43. Thus, threaded collar 32 can rotate within rigid tab 42, allowing adjustment of second lens holder 16, but cannot move forward or backward within rigid tab 42. In this regard, spring 46 positioned within tubular appendage 28 maintains an opposing force between rigid tab 42 and tubular appendage 28 thus precisely maintaining the position of tubular appendage 28 relative to rigid tab 42, as well as preventing backlash between threaded portion 54 of threaded collar 32 and threaded portion 34 of tubular appendage 28.

An additional feature of the invention, as shown in FIG. 1, is the measuring mechanism 26 which measures changes in the focal point of the lens system 38. This may be accomplished by a potentiometer or other commonly known means of measuring incremental movement. In a preferred embodiment, a potentiometer 55 is positioned about shaft 56, which is mechanically connected to shaft 30 by means of a set of gears 58. Potentiometer 55 indicates electronically the amount of revolution of shaft 56 during focusing. The rotation of shaft 56 is in direct correspondence to the rotation of shaft 30. Potentiometer 55 is calibrated to correlate the amount of revolution of shaft 56 to the distance which second lens holder 16 moves with relation to lens holder 14 and thereby indicates the corresponding shift in focal point of objective lens series 38.

In order to utilize the measuring system 26, first objective lens 36 is placed against calibration standard 100, as shown in FIG. 3. Calibration standard 100 comprises a glass slide 102 positioned on a mirror 104 having a scratched surface 106. A water coating 108 is interposed between slide 102 and mirror 104. A water coating 110 is also placed above slide 102. First objective lens 36 is brought into contact with water coating 110 and sufficient force is exerted to compress all elements. Lens system 38 (not shown in FIG. 3) is then focused on the scratched surface 106 of mirror 104. In a preferred embodiment, slide 102 is either 0.17 or 0.52 MM in thickness. The electronic readout portion (not shown) of potentiometer 55 is then adjusted. The focal length from the end of first objective lens 36 to the surface 106 of mirror 104 is 0.4 MM in the case of a 0.17 MM slide in a water coating which represents the minimum thickness of the human cornea. Similarly, when the thickness of slide 102 is 0.52 MM and objective lens series 38 is focused on surface 106 of mirror 104, the focal length from the end of first objective lens 36 to surface 106 is 1.2 MM, representing the maximum thickness of the human cornea. Therefore, when first objective lens 36 is placed against the cornea, and focused on the endothelium, any change in focus changes the readout and thus provides a reading of the corneal thickness. It should be noted that the amount of force exerted against the cornea does not change the thickness due to the fact that the cornea is a liquid body.

An additional feature of the invention is the improved design of the knob 80 used to focus and measure thickness. As best shown in FIG. 4, the mount for the potentiometer has a raised tab 60 which acts as a stop. A pin 62 extends from collar 64 positioned about shaft 56.

The initial position of shaft 56 occurs when pin 62 is in contact with the first side 66 of tab 60. As shaft 56 rotates, pin 62 also rotates until it comes in contact with second side 68 of tab 60 causing it to stop. At this point, shaft 56 is rotated approximately 350°. As shown in FIG. 5, in collar 64 is a gap 70. A second pin 72 extends from knob 80. This pin 72 is positioned against edge 76 in gap 70 before rotation begins. When first pin 62 comes in contact with side 68 of tab 60 causing collar 64 to stop, knob 80 continues to rotate within collar 64 until second pin 72 is stopped by the opposite edge 78 of gap 70 and as a result, a rotation of 360° by shaft 56 is allowed.

The foregoing description and drawings merely explain and illustrate the invention and the invention is not limited thereto except insofar as the appended claims are so limited as those skilled in the art who have the disclosure before them will be able to make modifications and variations therein without departing from the scope of the invention.

What is claimed is:

1. An objective for a microscope which comprises:
    a housing member;
    a first tubular objective lens holding member slidably and telescopically disposed within said housing member;
    a second tubular objective lens holding member slidably and telescopically disposed within said first tubular objective holding member;
    spring loading means for controlledly allowing said first and second tubular objective holding members to recede within said housing member upon impact between the first objective lens member and the object being viewed, and for causing said lens holders to return to their original position upon removal of the object from the objective; and
    focusing means for incremental movement of said second tubular objective lens holding member thereby focusing the objective lenses contained therein while maintaining the position of the first objective lens holding member.

2. The invention according to claim 1, further including measuring means for providing a precise measurement of the thickness of the specimen being viewed by means of a quantification of the incremental movement of said second tubular objective lens holding member between first and second focal points.

3. The invention according to claim 1 in which said focusing means comprises:
    a tubular appendage extending from said second tubular objective lens holding member;
    a shaft member driving a threaded collar member engaged within a threaded portion of said tubular appendage whereby when said shaft member and threaded collar member are rotated said second tubular objective lens holding member moves incrementally forward or backward within said tubular housing member, depending on the direction of rotation of shaft member;
    a spring member positioned within said tubular appendage which prevents backlash between said threaded portion and said threaded collar; and
    mechanical means for rotation of shaft member.

4. The invention according to claim 1 in which a first objective lens is contained within said first tubular objective lens holding member and the remainder of the objective lenses are contained within said second tubular objective lens holding member.

5. The invention according to claim 3 in which said first objective lens is easily removable and replaceable.

6. The invention according to claim 1 in which said objective is designed to examine the cornea endothelium without injury to the patient, and to accurately measure said cornea during said examination.

7. The invention according to claim 3 in which; said spring loading means comprises:
    sleeve bearing means between said first tubular objective lens holding member and said housing member for the sliding movement of said first tubular objective lens holding member within said housing member;
    a tab member extending substantially perpendicularly from the interior edge of said first tubular objective lens holding member, said tab member having a circular aperture therethrough rotatably engaged about said threaded collar member, said threaded collar member being engaged in said tubular appendage extending from said second lens holding member;
    said tab member abutting a portion of said threaded collar member, and having a lock nut member attached to said threaded collar member on the opposite side of said tab member from said abutment, whereby said threaded collar member is permitted to rotate within said tab member, but is forced along said shaft member by said tab member upon the movement of said first lens holding member into said housing; and
    a spring member abutting said tubular appendage on the opposite side from said tab member whereby the movement of said first and second lens holders into said housing is retarded.

8. The invention according to claim 7 in which said shaft member further includes:
    slot and pin means for permitting the linear movement of said tubular appendage and said threaded collar along said shaft member, said slot and pin means also effecting rotation of said threaded collar when said shaft member is rotated.

9. The invention according to claim 3 in which said threaded collar has 44 threads per inch thereon whereby one revolution of said shaft member results in a movement of said second objective lens holder of 0.23 MM which corresponds to a shift in focal length of 1 MM.

10. The invention according to claim 2 comprising:
    a potentiometer for measurement of one increment of rotation of a shaft member, said potentiometer including stop means for allowing rotation of said shaft member up to precisely 360°.

* * * * *